Figure 1:
Figure 1:
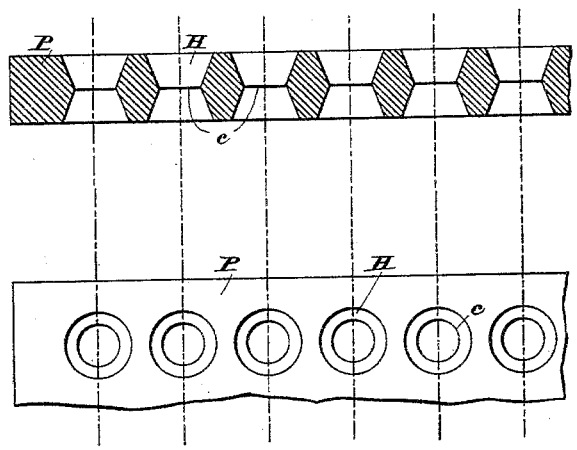

(No Model.)

J. S. SELLON.
SECONDARY BATTERY.

No. 401,466. Patented Apr. 16, 1889.

Fig. 1ª.

Witnesses.
Geo. W. Breck.
C. E. Ashley

Inventor.
John S. Sellon
By his Attorney Wm B. Vansize

N. PETERS, Photo-Lithographer, Washington, D. C.

UNITED STATES PATENT OFFICE.

JOHN S. SELLON, OF HATTON GARDENS, COUNTY OF MIDDLESEX, ENGLAND, ASSIGNOR TO THE ELECTRICAL ACCUMULATOR COMPANY, OF NEW YORK.

SECONDARY BATTERY.

SPECIFICATION forming part of Letters Patent No. 401,466, dated April 16, 1889.

Application filed April 19, 1887. Serial No. 235,425. (No model.) Patented in England June 15, 1882, No. 2,818.

*To all whom it may concern:*

Be it known that I, JOHN SCUDAMORE SELLON, a subject of the Queen of Great Britain and Ireland, and a resident of Hatton Gardens, in the county of Middlesex, England, have invented certain new and useful Improvements in Secondary Batteries, (for which I have obtained a patent in Great Britain, No. 2,818, dated June 15, 1882,) of which the following is a specification.

My invention relates to secondary batteries or electrical accumulators, and more particularly to the supports, retainers, or frames in or upon which the active material is placed or packed. These plates I form with a series of perforations or holes, each hole or perforation being separated from those adjoining, and being surrounded by walls or partitions having a double-bevel cross-section so arranged that the areas of the holes or perforations measured at the two surfaces of the plate are substantially equal, while such surface area is greater than the area at an intermediate point or plane between the surfaces of the plate. In these perforations the active material is placed or packed, the perforations being of such form that the active material when in position assumes the shape of a series of buttons having the geometrical form of a double cone or double pyramid joined. Such formation prevents the buttons from falling out of the perforations—that is to say, the buttons are keylocked—while each button of active material is comparatively small, and is surrounded by a conductor or terminal, from which the charging-current enters. This construction of plate or support having small regular geometrical forms when combined with active material is greatly superior to any other, especially that form of plate having long slots or shelves, to which active material is applied in the form of wide double wedges. As is well known, there is a chemical action tending to produce two disastrous effects—contortion of the plate and splitting of these buttons or wedges. When a split is started in a wedge-shaped piece, such as would be found in the long slots, it runs the whole length, and a large section of active material is displaced. When there occurs contortion or buckling, the wide wedge-shaped sections are broken and fractured. These results are not incident to the use of my improved form of plate. When a split is started, it can only displace that one small section of active material in which it occurs. When the plate is bent into a curved surface, there is little or no fracture of the active material, for the diameter of a perforation is so short a line as to lie almost entirely within the curved line forming the surface of the bent plate, and no disturbance of the button of active material is noticeable, the double-bevel section serving to retain it in position.

The accompanying drawings illustrate my invention.

Figure 1 is a cross-section of a plate or support having perforations formed as described. Fig. 1ᵃ shows the form of the button of active material placed in the perforations.

The plate or support P is of conducting material, as a plate of lead having holes or perforations H smaller in cross-section at or near the center of the plate c than at the surfaces—that is, the wall or partition surrounding and separating the holes or perforations has a double-bevel cross-section so arranged that the greater area of the holes or perforations is at the surface of the plate P, and is greater than the area at a plane or point intermediate the surfaces c.

A is the button of active material, preferably consisting of a paste of oxide of lead and dilute sulphuric acid molded into form by pressing the paste in the holes H. This button is in the form of a double cone or double pyramid—that is, two cones or pyramids united. The result of this formation is that the buttons are locked into position and can only be removed by breaking or fracturing.

Heretofore others have employed plates containing long slots, the separating-walls on two opposite sides only being double-bevel in cross-section. Such construction differs from my invention in that the improved plate invented by me furnishes a support for small regular uniform geometrical sections or buttons of active material.

What I claim, and desire to secure by Letters Patent, is—

In a secondary battery, a plate or support of conducting material containing a series of uniform holes or perforations separated and surrounded by walls or partitions having a double-bevel cross-section, so arranged that the areas at the surfaces are substantially equal, but greater than the area at an intermediate plane, in combination with an active material located within such holes or perforations in the form of a series of equal truncated cones or pyramids united at their apices, substantially as described.

In testimony whereof I have signed my name to this specification in the presence of two subscribing witnesses.

JOHN S. SELLON.

Witnesses:
S. C. TAUSA,
RUDOLPH CHAS. NICKOL,
*Both of 9 Birchin Lane, London, E. C.*